(12) United States Patent
Kiim

(10) Patent No.: US 7,610,496 B2
(45) Date of Patent: Oct. 27, 2009

(54) CONTROLLING HEAT GENERATED BY A CENTRAL PROCESSING UNIT UTILIZING BATTERY POWER MANAGEMENT MODES WHEN POWER SUPPLY IS LIMITED

(75) Inventor: Yang Hoon Kiim, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 486 days.

(21) Appl. No.: 11/533,335

(22) Filed: Sep. 19, 2006

(65) Prior Publication Data

US 2007/0113109 A1    May 17, 2007

(30) Foreign Application Priority Data

Nov. 17, 2005    (KR) ................ 10-2005-0109947

(51) Int. Cl.
G06F 1/00 (2006.01)
G06F 1/32 (2006.01)
G05D 23/00 (2006.01)
(52) U.S. Cl. .............. 713/300; 713/320; 700/299
(58) Field of Classification Search ............. 713/300
See application file for complete search history.

(56) References Cited

U.S. PATENT DOCUMENTS

| | | | |
|---|---|---|---|
| 5,838,578 A * | 11/1998 | Pippin | 716/4 |
| 6,535,798 B1 * | 3/2003 | Bhatia et al. | 700/293 |
| 6,928,559 B1 * | 8/2005 | Beard | 713/300 |
| 7,461,272 B2 * | 12/2008 | Rotem et al. | 713/300 |

FOREIGN PATENT DOCUMENTS

| | | |
|---|---|---|
| JP | 10-307635 | 11/1998 |
| KR | 10-20010018576 | 3/2001 |

* cited by examiner

Primary Examiner—Suresh K Suryawanshi
(74) Attorney, Agent, or Firm—Fish & Richardson P.C.

(57) ABSTRACT

Controlling heat generated by a computer includes using a thermal sensor configured to monitor temperature of a CPU, a peripheral device controller configured to determine if the monitored temperature of the CPU is higher than a threshold temperature, and an application program configured to designate one or more operating modes for the CPU. The operating modes includes a clock setting and power setting for the CPU based on results from the peripheral device controller. An operating system is configured to implement the clock signal and power settings for the CPU based on results from the application program.

23 Claims, 3 Drawing Sheets

FIG.2

|  | NORTH BRIDGE FUNCTION | SPEEDSTEP FUNCTION |
|---|---|---|
| CPU SPEED | 1023Khz | 1064Khz |
| POWER CONSUMPTION | 37.3W | 26.9W |
| CPU TEMPERATURE | 67° | 52° |

CONTROLLING HEAT GENERATED BY A CENTRAL PROCESSING UNIT UTILIZING BATTERY POWER MANAGEMENT MODES WHEN POWER SUPPLY IS LIMITED

BACKGROUND

This description relates to the control of heat generated by a central processing unit (CPU) of a computer.

Frequency is the number of recurrences of a periodic phenomenon (e.g., the oscillation of a current, a voltage, an electric field, or a magnetic field) per unit of time (e.g., per second). A clock signal is a synchronization signal generated in the computer, and the CPU can be classified according to its operating clock frequency expressed in Hz. For example, if the clock frequency of the CPU is 1.6 GHz, 1,600,000,000 signals are generated per second. The performance of the CPU typically improves with the number of signals generated per second. However, as the clock frequency increases, the CPU typically generates more heat and consumes more power.

The relatively small size of portable computing devices, such as notebook computers, limits the size and quantity of cooling fans used in the computing devices. Moreover, if the notebook computer is operated by a battery, use of such cooling fans may result in a decrease in battery usage time, particularly as the amount of heat increases with increasing clock frequencies.

SUMMARY

In one general aspect, heat generated by a CPU can be controlled efficiently by setting a INTEL SPEEDSTEP® mode through an operating system instead of a system BIOS.

In another general aspect, an apparatus for controlling heat generated by a computer includes a thermal sensor configured to monitor a temperature of a CPU, a peripheral device controller configured to determine if the monitored temperature of the CPU is higher than a threshold temperature, and an application program configured to designate one or more operating modes for the CPU. Each operating mode includes a clock signal setting and power setting for the CPU that are based on results from the peripheral device controller. An operating system is configured to implement the clock signal and power settings for the CPU based on results from the application program.

Implementations may include one or more of the following features. For example, the application program may be configured to provide a control signal for varying the threshold temperature.

The peripheral device controller may be configured to further determine if the monitored temperature is at or below a second threshold temperature.

The clock signal setting and the power setting of the CPU may include a first setting mode for controlling the clock signal setting and the power setting of the CPU to be equal to or less than half of a maximum clock signal setting and a maximum power setting, respectively. A second setting mode for controlling the clock signal setting and the power setting of the CPU may be provided by or controlled through an external control signal. The first setting mode may be an optimal battery mode.

In another general aspect, an apparatus for controlling heat generated by a CPU of a computer includes a control unit configured for measuring a temperature of the CPU and for controlling a clock signal setting and a power setting of the CPU through an operating system of the computer. The clock signal setting and the power setting are controlled according to the measured temperature.

Implementations may include one or more of the following features. For example, the control unit may be configured to set the clock signal setting and the power setting of the CPU at or below half of a maximum clock signal setting and at or below half of a maximum power setting if the temperature of the CPU is higher than the predetermined temperature. The control unit also may be configured to set the clock signal and the power setting of the CPU to default settings if the temperature of the CPU is lower than a predetermined threshold temperature.

In another general aspect, controlling heat generated by a CPU of a computer includes monitoring a CPU temperature, determining if the CPU temperature exceeds a threshold temperature, and setting a clock signal and a power setting of the CPU with an operating system and based on the monitored CPU temperature.

Implementations may include one or more of the following features. For example, the threshold temperature may be set, by the user or otherwise, for controlling the clock signal and power setting of the CPU. The clock signal setting and the power setting of the CPU may be set to default settings if the temperature of the CPU is lower than the threshold temperature. The threshold temperature may include a predetermined temperature range.

The clock signal setting and the power setting of the CPU may be set at or below half of a maximum clock signal setting and a maximum power setting if the temperature of the CPU is higher than the threshold temperature.

An optimal battery mode for the CPU may be set for the CPU if the temperature of the CPU is higher than the threshold temperature.

A clock signal setting and power setting may be set with an external control signal supplied to the CPU if the temperature of the CPU is lower than the threshold temperature.

In another general aspect, a computer-readable recording medium stores computer-executable program codes that are configured to cause a computer to implement a temperature control method for a CPU in a computer system, the method including monitoring a CPU temperature, determining if the CPU temperature exceeds a threshold temperature, and setting a clock signal and a power setting of the CPU with an operating system and based on the monitored CPU temperature.

Implementations may include one or more of the following features. For example, the method may further include setting the threshold temperature. The clock signal setting and the power setting of the CPU may be set according to a default operating mode if the temperature of the CPU is exceeds the threshold temperature.

Other features and advantages will be apparent from the following description, including the drawings, and the claims.

BRIEF DESCRIPTION OF THE DRAWINGS

FIG. 2 is a table of comparative results between CPU control through an INTEL SPEEDSTEP® function and CPU control through a North Bridge function.

DETAILED DESCRIPTION

In general, the same reference numbers will be used throughout the drawings to refer to the same or like parts.

Figure 1:
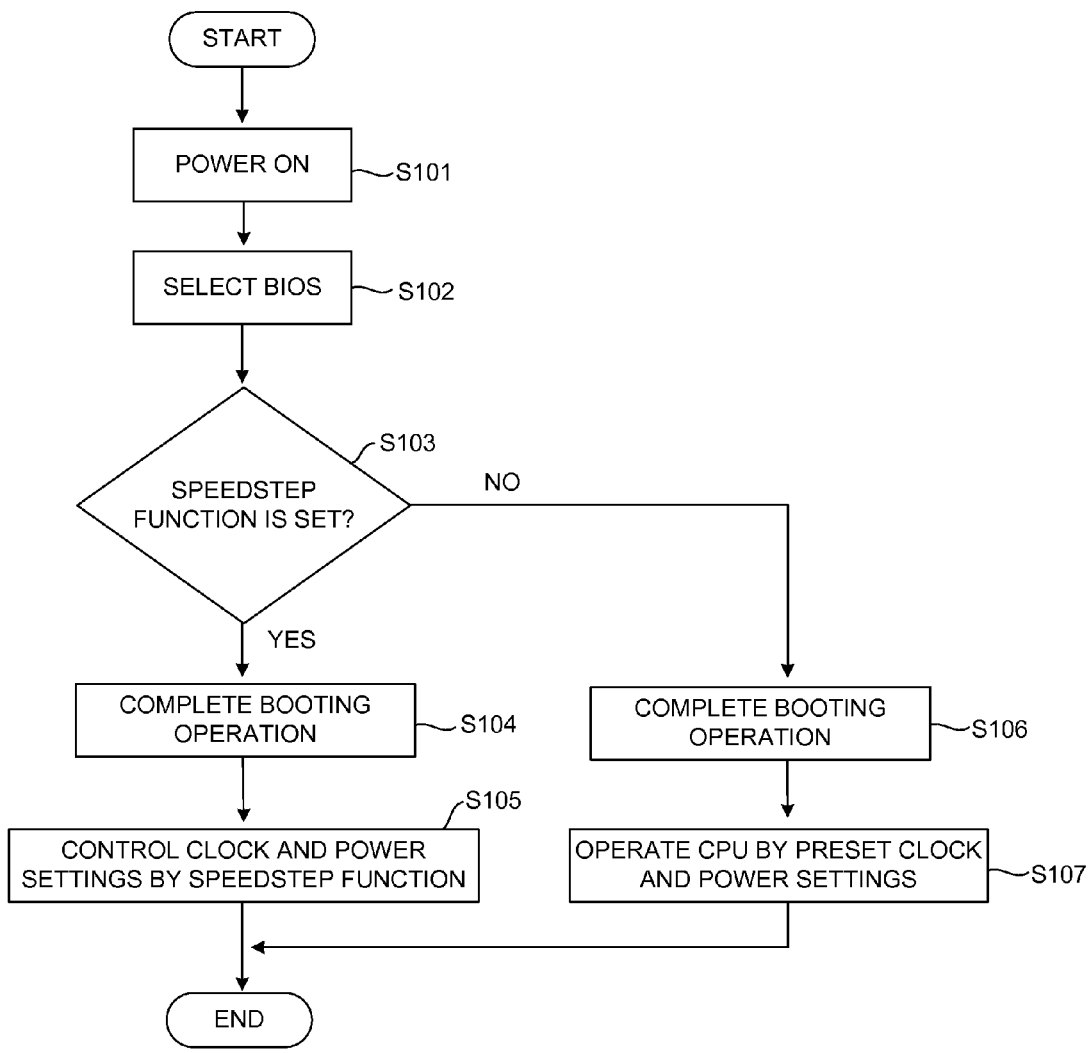
FIG. 1 is a flowchart of an exemplary process for controlling heat generated by a CPU using an INTEL SPEEDSTEP® function.

Various methods for controlling heat generated by a CPU have been implemented in portable computing devices. For example, referring to FIG. 1, one type of heat control process utilizes an INTEL SPEEDSTEP® function. Initially, the power to the CPU is turned on (S101). Next, a basic input/output system (BIOS) selection key is pressed to select a BIOS setting screen (S102). For example, the BIOS selection key may be 'F2' or 'Ctrl+F2", and the BIOS setting screen can be selected by pressing the BIOS selection key within a predetermined time during an initial system booting operation.

If an INTEL SPEEDSTEP® function is selected among submenus of the BIOS setting screen (S103), the booting operation is completed with this setting applied (S104). Thereafter, the power setting and the clock setting of the CPU are controlled according to the designated INTEL SPEEDSTEP® function (S105). The INTEL SPEEDSTEP® function incorporates a technique for lowering the clock frequency of the CPU to reduce the power consumption when one or more programs running on the computer requires less CPU or battery support than typically required.

If the INTEL SPEEDSTEP® function is not set (S103), the booting operation is completed (S106) and then the CPU is operated according to a preset clock setting and a preset power setting (S107). Alternatively, a North bridge function can be used to adjust the clock throttling register of the system chipset so as to control the heat generated by the CPU.

However, since the North bridge function typically only reduces the operating clock frequency of the CPU, without adjusting the power consumption of the CPU, adequate heat control may be more difficult to achieve.

Referring to FIG. 2, a table of comparative results between CPU control through an INTEL SPEEDSTEP® function and CPU control through a North Bridge function indicates that higher clock frequencies and lower CPU operating temperatures may be achieved through the use of the INTEL SPEEDSTEP® than by the North Bridge function. Specifically, the INTEL SPEEDSTEP® function appears to provide better results because it simultaneously controls the power consumption and clock signal settings of the CPU, and thereby more efficiently controls CPU temperature than the North Bridge function. However, if the INTEL SPEEDSTEP® function is set by the BIOS, the control of heat generated by the CPU may be unstable and/or inconsistent over a period of time.

Figure 3:
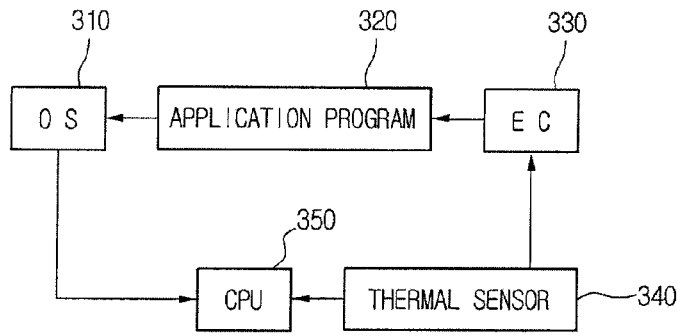
FIG. 3 is a block diagram of an apparatus for controlling heat generated by a CPU.

Referring to FIG. 3, this problem may be avoided by using an apparatus that controls heat generated by a CPU by setting an INTEL SPEEDSTEP® function through an operating system (OS). The apparatus includes an OS 310 for performing a basic function during a booting operation of a computer, a CPU 350 for performing an operation and control of the computer in association with the OS 310, and a thermal sensor 340 for sensing and monitoring the temperature of the CPU. An embedded controller (EC) 330 is provided for periodically checking the sensed temperature of the CPU 350 to determine a heat control mode, and an OS-based application program 320 is provided for controlling the heat of the CPU 350 according to the heat control mode determined by the EC 330.

The OS 310 includes a general operating system of a computer, which may be, for example, a Windows-based or Mac notebook computer. The application system 320 may include various application programs, as well as the application system for controlling the heat of the CPU 350 according to the heat control mode determined by the EC 330.

The thermal sensor 340 checks the temperature of the CPU 350, and displays or retains the monitored temperature data. The EC 330 periodically checks the temperature data of the thermal sensor 340. The EC 330 may be a controller of a peripheral device of a notebook computer, and may control a serial port device, a battery, an Internet keyboard, an LCD, and/or various other devices, such as key input devices.

The ECC 330 periodically checks if the monitored temperature of the CPU 350 is higher than a predetermined temperature. If the monitored temperature is higher than the predetermined temperature, the ECC 330 informs the application program 320 of the temperature state so that the clock signal and power setting of the CPU 350 are controlled according to the optimal battery mode of the INTEL SPEEDSTEP® function. Thereafter, if the monitored temperature of the CPU 350 is lower than a predetermined threshold temperature, the clock signal and power setting of the CPU 350 are controlled by a CPU mode preset by a user though the OS 310. Alternatively, the clock signal and power setting of the CPU 350 may be controlled based on several threshold temperatures so as to create a range of temperatures and associated clock signal and power settings for each temperature range.

A number of CPU-related operating modes of the INTEL SPEEDSTEP® function may be provided. In an optimal performance mode, the clock signal and power setting of the CPU 350 are maintained at a relatively high level to perform the maximum function of the computer. In an automatic mode, the clock signal and power setting of the CPU 350 are controlled proportionally to the system load of the computer. In an optimal battery mode, the clock signal and power setting of the CPU 350 are reduced below half of the maximum value to reduce the power consumption. In a maximum battery mode, the clock and power of the CPU 350 are adjusted according to the residual amount of the battery power to reduce the power consumption more than is done in the optimal battery mode.

In general, the optimal performance mode is performed when the notebook computer is provided with power through an external AC adapter. If the notebook computer is operated with the battery, the computer is typically operated selectively in one of the three remaining modes (automatic, optimal, maximum battery).

Accordingly, if the temperature of the CPU 350 is higher than the predetermined threshold temperature, the optimal battery mode is performed to reduce the clock signal setting and power setting of the CPU at or below approximately half of the maximum settings to reduce the heat generated by the CPU 350.

Figure 4:
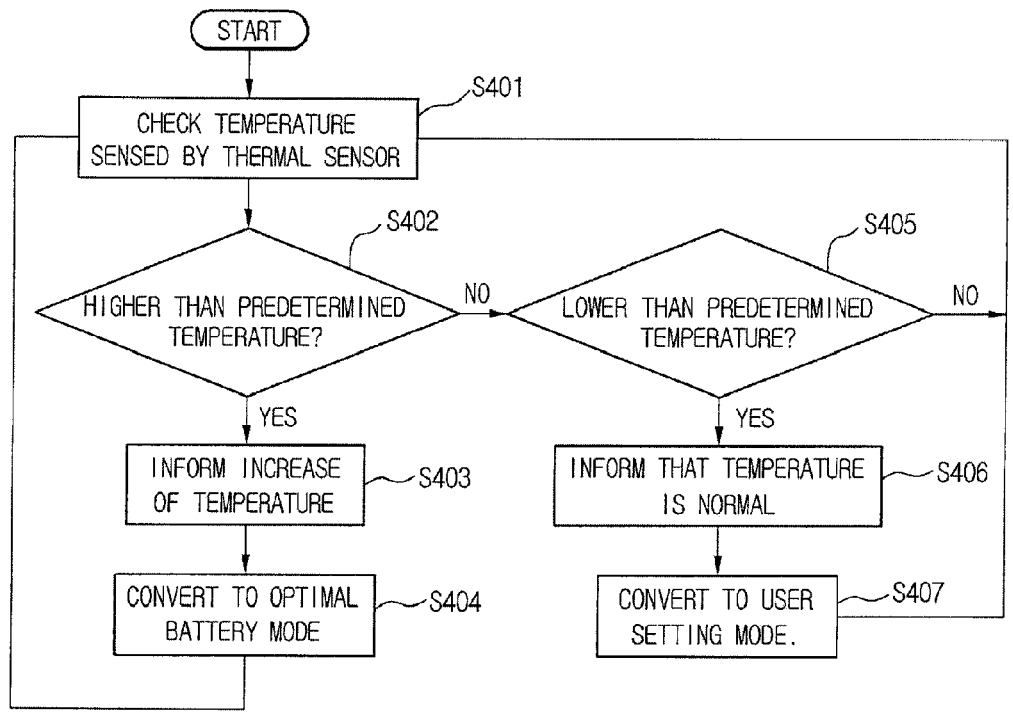
FIG. 4 is a flowchart of a process for controlling heat generated by a CPU.

Referring to FIG. 4, a process for controlling the heat generated by the CPU includes monitoring the CPU temperature provided by the thermal sensor (S401). As the system operates, the CPU 350 generates heat and the thermal sensor 340 continuously senses the temperature of the CPU 350. Alternatively, the thermal sensor 340 may be configured to sense temperatures periodically, e.g., every 1-5 seconds.

The EC 330 checks the CPU 350 temperature sensed by the thermal sensor 340 (S401). Next, the EC 330 determines if the monitored temperature is higher than the predetermined threshold temperature(s) (S402). For example, the predetermined temperature may fall within a predetermined range of temperatures, and may be set by the user through the OS 320 or may be automatically set by the OS 320 according to the performance of the CPU 350.

If the temperature of the CPU 350 is higher than the predetermined temperature (S402), the EC 330 informs the application program 320 of this state (S403). The application program 320 then controls the heat control mode of the CPU 350 with the OS 310 (S404). For example, the OS 310 may set the heat control mode to the optimal battery mode of the INTEL SPEEDSTEP® function.

In contrast, if the temperature of the CPU 350 is not higher than the predetermined threshold temperature (S402), the EC 330 further determines if the temperature of the CPU 350 is lower than the predetermined threshold temperature (S405). If the temperature is lower than the predetermined threshold temperature (S405), the EC 300 informs the application program 320 that the temperature of the CPU 350 is normal.

If the temperature of the CPU 350 is normal, the application program 320 controls the CPU 350 through the OS 310 to operate in the original operating mode (e.g., the original operating mode set by the user through the OS 310). Accordingly, the user may set the clock signal and power settings of the CPU 350 when using the notebook computer, and may preset the proper operating temperature range or threshold temperatures with the application program 320. For example, the CPU 350 may be initially operated at the clock signal and power settings designated by the user, and which may serve as default settings.

If the temperature of the CPU 350 deviates from the initially-set temperature range (e.g., increases above this range), the EC 330 informs the application program 320 of this state and the application program 320 controls the heat control mode of the CPU 350 with the OS 310 to operate in the optimal battery mode of the INTEL SPEEDSTEP® function. Accordingly, the CPU 350 is operated in the optimal battery mode, and the CPU temperature is lowered to an optimal operating temperature (e.g., approximately 45-70° C., and more specifically 45-55° C.).

If the temperature of the CPU 350 is again lowered to the proper operating temperature, the EC 330 informs the application program 320 of this state and the application program 320 controls the OS 310 so as to cause the initially-set clock signal and power settings of the CPU 310 to be supplied. The aforementioned process may be repeated to prevent the CPU 350 from being overheated.

As described above, the heat generated by the CPU 350 can be stably and simply controlled by setting the clock signal and power setting of the CPU 350 through the OS and based on the CPU temperature. Accordingly, CPU temperature and the heat generated from the CPU may be efficiently and reliably controlled to protect the CPU and the computer.

Although particular implementations have been described for illustrative purposes, those skilled in the art will appreciate that various modifications, additions and substitutions are possible, without departing from the scope and spirit of the claims. For example, the aforementioned temperature control process may be provided on a computer-readable recording medium. The computer-readable medium may include all kinds of recording devices in which data readable by a computer system are stored. For example, the computer-readable medium include one or more of ROM, PAM, an EEPROM, a flash EEROM, a floppy disk, a CD-ROM, an optical data storage device and so forth.

What is claimed is:

1. An apparatus for controlling heat generated by a computer, the apparatus comprising:
a thermal sensor configured to monitor a temperature of a CPU;
a peripheral device controller configured to determine if the monitored temperature of the CPU is higher than a threshold temperature;
an application program configured to access battery power management modes and to leverage the battery power management modes by selecting a battery conserving operating mode when a CPU power supply is limited and a performance operating mode when the CPU power supply is not limited, wherein each operating mode includes a clock signal setting and a power setting for the CPU, the application program being further configured to receive a temperature indication from the peripheral device controller and to use the temperature indication as an additional basis for selecting between the battery conserving operating mode and the performance operating mode; and
an operating system configured to implement the clock signal and power settings for the CPU based on results from the application program.

2. The apparatus according to claim 1, wherein the application program is configured to provide a control signal for varying the threshold temperature.

3. The apparatus according to claim 1, wherein the peripheral device controller is configured to further determine if the monitored temperature is at or below a second threshold temperature.

4. The apparatus according to claim 1, wherein the battery conserving operating mode includes a clock signal setting and a power setting of the CPU equal to or less than half of a maximum clock signal setting and a maximum power setting, respectively.

5. An apparatus for controlling heat generated by a CPU of a computer, the apparatus comprising:
a control unit configured to measure a temperature of the CPU and to control a clock signal setting and a power setting of the CPU through interfacing with an application program of an operating system of the computer according to the measured temperature,
wherein the application program is configured to access battery power management modes and to leverage the battery power management modes by selecting a battery conserving operating mode when a CPU power supply is limited and a performance operating mode when the CPU power supply is not limited, wherein each operating mode includes a clock signal setting and a power setting for the CPU, the application program being further configured to receive a temperature indication from the control unit and to use the temperature indication as an additional basis for selecting between the battery conserving operating mode and the performance operating mode.

6. The apparatus according to claim 5, wherein the battery conserving operating mode includes a clock signal setting and a power setting of the CPU equal to or less than half of a maximum clock signal setting and a maximum power setting, respectively.

7. The apparatus according to claim 5, wherein the control unit is configured to interface with the application program to set the clock signal setting and the power setting of the CPU according to the performance operating mode if the temperature of the CPU is lower than a predetermined threshold temperature.

8. A method for controlling heat generated by a CPU of a computer, the method comprising:
- receiving an indication of a CPU temperature, the indication being generated as a result of:
  - monitoring a CPU temperature, and
  - determining if the CPU temperature exceeds a threshold temperature;
- accessing battery power management modes including a battery conserving operating mode configured to be used when a CPU power supply is limited and a performance operating mode configured to be used when the CPU power supply is not limited, each operating mode includes a clock signal setting and a power setting for the CPU;
- selecting, based on the received indication of the CPU temperature, the battery conserving operating mode or the performance operating mode; and
- setting the clock signal setting and the power setting of the CPU based on a selection of the battery conserving operating mode or a selection of the performance operating mode.

9. The method according to claim 8, further comprising setting the threshold temperature for generating the indication of the CPU temperature.

10. The method according to claim 8, further comprising setting the clock signal and power setting of the CPU according to the performance operating mode if the temperature of the CPU is lower than the threshold temperature.

11. The method according to claim 8, wherein the threshold temperature comprises a predetermined temperature range.

12. The method according to claim 8, wherein the battery conserving operating mode includes a clock signal setting and a power setting of the CPU equal to or less than half of a maximum clock signal setting and a maximum power setting, respectively.

13. The method according to claim 8, wherein the performance operating mode includes a clock signal and a power setting of the CPU greater than half of a maximum clock signal setting and a maximum power setting, respectively.

14. A computer-readable recording medium in which computer-executable program codes are stored, the program codes being configured to cause a computer to implement a process comprising:
- receiving an indication of a CPU temperature, the indication being generated as a result of:
  - monitoring a CPU temperature, and
  - determining if the CPU temperature exceeds a threshold temperature; and
- accessing battery power management modes including a battery conserving operating mode configured to be used when a CPU power supply is limited and a performance operating mode configured to be used when the CPU power supply is not limited, each operating mode includes a clock signal setting and a power setting for the CPU;
- selecting, based on the received indication of the CPU temperature, the battery conserving operating mode or the performance operating mode; and
- setting the clock signal setting and the power setting of the CPU based on a selection of the battery conserving operating mode or a selection of the performance operating mode.

15. The computer-readable recording medium according to claim 14, wherein the process further comprises setting the threshold temperature for generating the indication of the CPU temperature.

16. The computer-readable recording medium according to claim 14, further comprising setting the clock signal and power setting of the CPU according to the performance operating mode if the temperature of the CPU is lower than the threshold temperature.

17. The computer-readable recording medium according to claim 14, wherein the battery conserving operating mode includes a clock signal setting and a power setting of the CPU equal to or less than half of a maximum clock signal setting and a maximum power setting, respectively.

18. The computer-readable recording medium according to claim 14, wherein the performance operating mode includes a clock signal and a power setting of the CPU greater than half of a maximum clock signal setting and a maximum power setting, respectively.

19. The apparatus according to claim 1, wherein the performance operating mode includes a clock signal setting and a power setting of the CPU equal to or greater than half of a maximum clock signal setting and a maximum power setting, respectively.

20. The apparatus according to claim 1, wherein the thermal sensor is configured to sense and monitor the temperature of the CPU.

21. The apparatus according to claim 1, wherein the peripheral device controller is configured to periodically check the sensed temperature of the CPU to determine if the monitored temperature of the CPU is higher than a threshold temperature, wherein the peripheral device controller is adapted to inform the application program of a temperature state only if the temperature of the CPU deviates from a predetermined temperature.

22. The method of claim 8, wherein receiving an indication of the CPU temperature generated us the result of monitoring the CPU temperature includes receiving the indication of the CPU temperature generated us a result of periodically checking the monitored temperature of the CPU with a peripheral device controller.

23. The apparatus according to claim 5, wherein the performance operating mode includes a clock signal setting and a power setting of the CPU equal to or greater than half of a maximum clock signal setting and a maximum power setting, respectively.

* * * * *